(12) United States Patent
Naruse

(10) Patent No.: US 10,384,495 B2
(45) Date of Patent: Aug. 20, 2019

(54) TIRE NOISE REDUCTION DEVICE AND PNEUMATIC TIRE

(71) Applicant: The Yokohama Rubber Co., LTD., Minato-ku, Tokyo (JP)

(72) Inventor: Masahiro Naruse, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 320 days.

(21) Appl. No.: 15/321,715

(22) PCT Filed: Jun. 19, 2015

(86) PCT No.: PCT/JP2015/067769
§ 371 (c)(1),
(2) Date: Dec. 22, 2016

(87) PCT Pub. No.: WO2015/198995
PCT Pub. Date: Dec. 30, 2015

(65) Prior Publication Data
US 2017/0136833 A1    May 18, 2017

(30) Foreign Application Priority Data

Jun. 24, 2014   (JP) .................................. 2014-129552

(51) Int. Cl.
*B60C 19/00*   (2006.01)
*B60C 5/00*    (2006.01)

(52) U.S. Cl.
CPC .................. *B60C 19/002* (2013.01)

(58) Field of Classification Search
CPC .................. B60C 19/002; B60C 5/00
See application file for complete search history.

(56) References Cited

U.S. PATENT DOCUMENTS 7,735,532 B2 * 6/2010 Tanno .................. B60C 19/002
                                                                152/157
8,342,289 B2 * 1/2013 Tanno .................. B60C 19/002
                                                                152/157

(Continued)

FOREIGN PATENT DOCUMENTS

JP        2006-306285       11/2006
JP        2010-000950        1/2010

(Continued)

OTHER PUBLICATIONS

International Search Report for International Application No. PCT/JP2015/067769 dated Jul. 21, 2015, 4 pages, Japan.

*Primary Examiner* — Edgardo San Martin
(74) *Attorney, Agent, or Firm* — Thorpe North & Western

(57) ABSTRACT

A tire noise reduction device includes a noise absorbing member formed of a porous material, a band member formed of a thermoplastic resin, the band member being an annular shape for mounting the noise absorbing member on a tire inner surface, a bonding member bent into a V-shaped cross section, and a band bonding section at a key point where the noise absorbing member, the band member, and the bonding member are bonded by interposing the noise absorbing member between the bonding member and the band member. The band member has a band width WB satisfying the following formula (a). A band thickness H (mm) of the band bonding section and a thickness h (mm) of the band member have a relationship satisfying the following formula (b).

20 mm ≤ WB ≤ noise absorbing member width (mm)   (a)

0.4 ≤ H/h ≤ 0.9   (b)

14 Claims, 8 Drawing Sheets

(56) References Cited

U.S. PATENT DOCUMENTS

| | | | | |
|---|---|---|---|---|
| 8,505,677 B2* | 8/2013 | Tanno | ................... | B60C 19/002 |
| | | | | 152/157 |
| 8,910,681 B2* | 12/2014 | Tanno | ................... | B60C 19/002 |
| | | | | 152/157 |
| 8,915,272 B2* | 12/2014 | Tanno | ................... | B60C 19/002 |
| | | | | 152/157 |
| 8,997,805 B2* | 4/2015 | Tanno | ................... | B29C 65/08 |
| | | | | 152/157 |
| 9,211,685 B2* | 12/2015 | Tanno | ................... | B29C 65/02 |
| 2006/0231185 A1 | 10/2006 | Tanno | | |
| 2009/0314402 A1* | 12/2009 | Kuramori | ............ | B60C 19/002 |
| | | | | 152/155 |
| 2009/0320980 A1 | 12/2009 | Tanno | | |
| 2013/0098522 A1 | 4/2013 | Tanno | | |
| 2013/0098533 A1 | 4/2013 | Tanno | | |
| 2013/0248070 A1* | 9/2013 | Tanno | ................... | B60C 19/002 |
| | | | | 152/450 |
| 2013/0248080 A1* | 9/2013 | Tanno | ................... | B60C 19/002 |
| | | | | 156/73.1 |
| 2018/0215208 A1* | 8/2018 | Kanenari | ........... | B29D 30/0681 |
| 2018/0215209 A1* | 8/2018 | Naruse | ...................... | B60C 5/00 |

FOREIGN PATENT DOCUMENTS

| | | | | |
|---|---|---|---|---|
| JP | 2012-240465 | 12/2012 | | |
| WO | WO 2005/012007 | 2/2005 | | |
| WO | WO 2006/118200 | 11/2006 | | |
| WO | WO2017170154 A1 * | 5/2017 | ............... | B60C 5/00 |

* cited by examiner

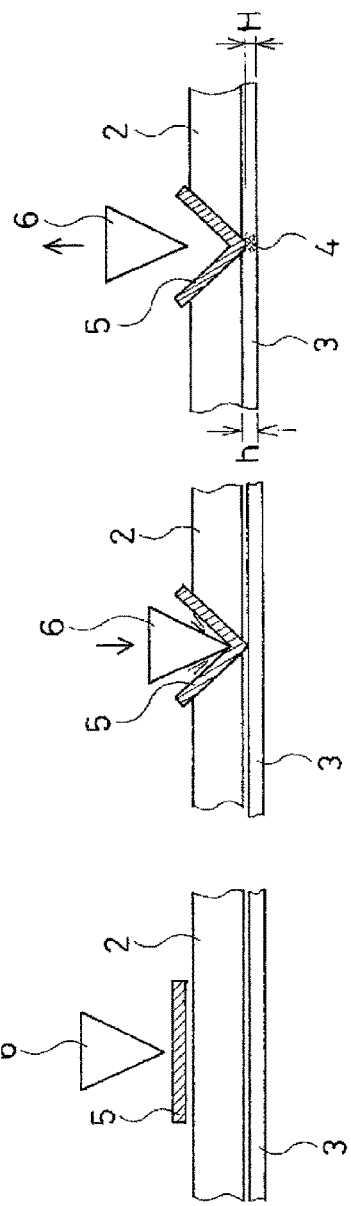

TIRE NOISE REDUCTION DEVICE AND PNEUMATIC TIRE

TECHNICAL FIELD

The present technology relates to a tire noise reduction device and a pneumatic tire.

BACKGROUND ART

In the field of conventional pneumatic tires, a tire noise reduction device is known which is provided with a noise absorbing member formed of a porous material, and a band member formed of a thermoplastic resin in an annular shape in a tire circumferential direction for mounting the noise absorbing member on the tire inner surface (see International Patent Application Publication No. WO/2005/012007 and Japanese Unexamined Patent Application Publication No. 2006-306285A).

Members which are formed so as to have elastic characteristics due to the material and the overall shape thereof are known as the band members. The band member typically has a strip shape and is formed by installing a long strip-shaped plate material formed with an overall annular shape such that the elastic restoring force thereof biases a noise absorbing member formed of a porous material so as to press in the tire inner surface direction in the tire cavity, whereby the noise absorbing member is held (claims of International Patent Application Publication No. WO/2005/012007 and paragraph 0016 of Japanese Unexamined Patent Application Publication No. 2006-306285).

Regarding the material of the band members, band members formed of thermoplastic synthetic resins, metal, or the like are known and band members formed of thermoplastic synthetic resins have been studied as band members which are practical in terms of being excellent in the formability of the band member itself and in the bonding workability such as bonding with noise absorbing members formed of a porous material being possible using thermal bonding (Japanese Unexamined Patent Application Publication Nos. 2006-306285 and 2010-000950A).

However, in contrast with conventional tire sizes in which noise reduction devices are used, in a case where a tire noise reduction device using a band member formed of thermoplastic synthetic resin is applied to a tire (for example, with an outer diameter of 630 mm or greater) designed to be able to travel at extremely high speeds (for example, 270 km/h or greater, and 300 km/h or greater), the band member may be subjected to plastic deformation (usually, stretching deformation) due to the band member being under a large amount of tension due to the mass of the noise absorbing member and the thermoplastic synthetic resin forming the band member softening due to heat build-up in the tire. In a case where the band member undergoes such plastic deformation, without being able to hold the noise absorbing member normally based on the elastic characteristics, there are concerns that it will not be possible to sufficiently exhibit the functions of the noise reduction device and that the durability will be adversely affected and lead to the failure of the noise reduction device.

SUMMARY

The present technology provides a tire noise reduction device which is able to prevent plastic deformation of the band member caused by large amounts of tension and heat from the tire even when traveling with a tire for high-speed travel at high speeds such as 270 km/h or greater and 300 km/h or greater, and sufficiently exhibit a noise reduction function such a high-speed traveling, and a pneumatic tire provided with the noise reduction device.

A tire noise reduction device of the present technology comprises a noise absorbing member formed of a porous material; a band member formed of a thermoplastic resin, the band member being formed in an annular shape in a tire circumferential direction for mounting the noise absorbing member on a tire inner surface; a bonding member bent into a V-shaped cross section; and a band bonding section at a key point where the noise absorbing member, the band member, and the bonding member are bonded by interposing the noise absorbing member between the bonding member and the band member. The band member has a band width WB satisfying the following formula (a), a band thickness H (mm) of the band bonding section and a thickness h (mm) of the band member have a relationship satisfying the following formula (b), and a band cross section area A with a cross section perpendicular to a band length direction at a band bonding position is greater than 20 mm$^2$, $$20 \text{ mm} \leq WB \leq \text{noise absorbing member width (mm)} \quad (a)$$

$$0.4 \leq H/h \leq 0.9 \quad (b).$$

In the tire noise reduction device of the present technology, having the configuration described above makes it possible to provide a tire noise reduction device which can prevent plastic deformation of the band member caused by heat from the tire, has good durability, and can sufficiently exhibit a noise reduction function, even when traveling with a tire for high-speed travel at high speeds such as 270 km/h or greater and 300 km/h or greater.

In the present technology, a yield strength of a band section at the band bonding position is preferably 330 N or greater.

In the present technology, the band bonding section is preferably provided in at least two locations relative to the noise absorbing member.

In the present technology, a position of the band bonding section is preferably 30 to 80 mm from an end portion of the noise absorbing member.

In the present technology, bonding of the noise absorbing member with the band member and the bonding member is preferably carried out by ultrasonic welding.

In the present technology, the band member and the bonding member are preferably formed of the same synthetic resin material.

The tire noise reduction device of the present technology having the preferable configurations described above makes it possible to realize the tire noise reduction device of the present technology which more clearly exhibits the effects of the tire noise reduction device of the present technology.

In addition, a pneumatic tire using the tire noise reduction device according to the present technology includes the tire noise reduction device described above preferably disposed in a tire cavity space using the band member. As a result, the pneumatic tire is provided in which the tire noise reduction device of the present technology described above is mounted. Such a pneumatic tire can prevent plastic deformation of the band member due to heat in the tire, has good durability, and sufficiently exhibits a noise reduction function, even when traveling with a tire for high-speed travel at high speeds such as 270 km/h or greater and 300 km/h or greater.

At this time, an inner diameter (radius) R of the tire and an annular shape outer diameter (radius) r of the band member formed in an annular shape preferably satisfy the following Formula (c). As a result, it is possible to realize a pneumatic tire which more clearly exhibits the effects of the pneumatic tire of the present technology described above.

$$0.9 \leq r/R \leq 0.99 \tag{c}$$

BRIEF DESCRIPTION OF DRAWINGS

FIGS. 4A to 4C are model diagrams illustrating an example process of a method for producing the tire noise reduction device according to the present technology and illustrate states where the bonding of the noise absorbing member with the band member and the bonding member is carried out by ultrasonic welding.

FIG. 5A is a tire circumferential direction cross sectional view and FIG. 5B is a tire width direction cross sectional view.

DETAILED DESCRIPTION

More detailed description will be given below of the tire noise reduction device and pneumatic tire of the present technology with reference to the drawings and the like.

Figure 1:
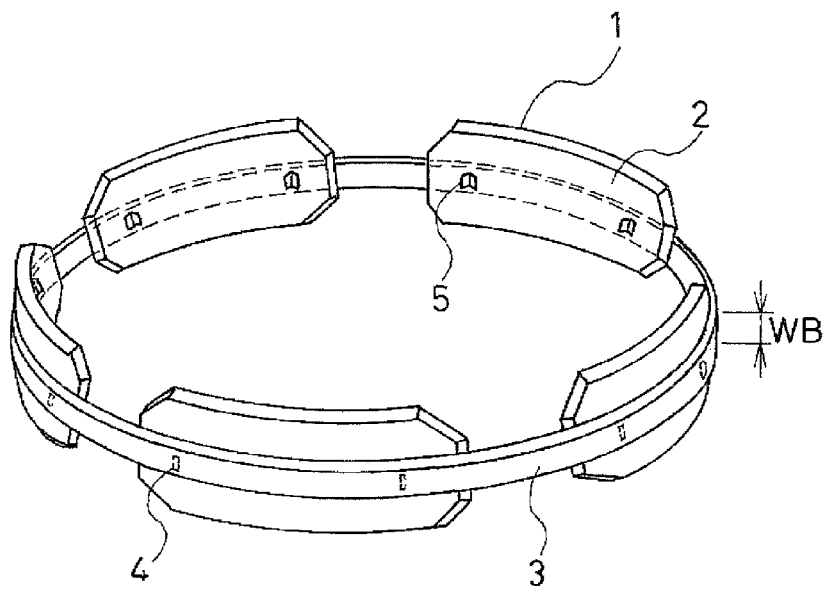
FIG. 1 is an external perspective view schematically illustrating an embodiment of a tire noise reduction device according to the present technology.
Figure 2:
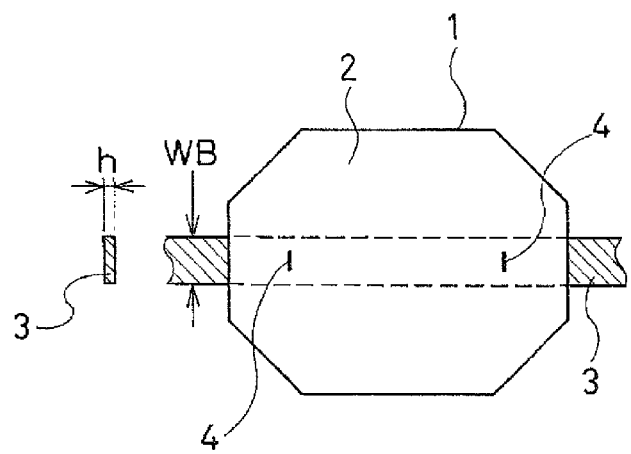
FIG. 2 is an enlarged view illustrating main parts an embodiment of a tire noise reduction device according to the present technology.

As illustrated in the model diagrams of FIG. 1 and FIG. 2, the tire noise reduction device 1 of the present technology includes a noise absorbing member 2 formed of a porous material; a band member 3 formed of a thermoplastic resin, the band member 3 being formed in an annular shape in a tire circumferential direction for mounting the noise absorbing member 2 on a tire inner surface; a bonding member 5 bent into a V-shaped cross section; and a band bonding section 4 at a key point where the noise absorbing member 2, the band member 3, and the bonding member 5 are bonded by interposing the noise absorbing member 2 between the bonding member 5 and the band member 3. The band member 3 has a band width WB satisfying the following formula (a). A band thickness H (mm) of the band bonding section 4 and a thickness h (mm) of the band member 3 satisfy the following formula (b). A band cross section area A with a cross section perpendicular to the band length direction at the band bonding section 4 is greater than 20 mm$^2$.

$$20 \text{ mm} \leq WB \leq \text{noise absorbing member width (mm)} \tag{a}$$

$$0.4 \leq H/h \leq 0.9 \tag{b}$$

In the tire noise reduction device 1 of the present technology, the band width WB of the band member 3 and the band thickness H (mm) of the band bonding section 4 satisfy Formula (a) and Formula (b) above, and under this premise, the band cross section area A with a cross section perpendicular to the band length direction at the band bonding section 4 is greater than 20 mm$^2$. As a result, the tire noise reduction device 1 can prevent plastic deformation of the band member 3 caused by heat from the tire, has excellent durability, and sufficiently exhibit the noise reduction function, even when traveling with a tire for high-speed travel at high speeds such as 270 km/h or greater and 300 km/h or greater.

The band thickness H (mm) in the band bonding section 4 and the thickness h (mm) of the band member 3 satisfying the relationship 0.4≤H/h≤0.9 has the meaning of bonding where the band member 3 is subjected to bonding pressure from the bonding member 5 and is subjected to more compressive force as the intrinsic band thickness is reduced. When the value of H/h is less than 0.4, the cross-sectional area is reduced and the high-speed durability performance becomes unadvantageous. When the value of H/h is greater than 0.9, the weld is weak and undesirable peeling off of the bonding member may occur.

According to the findings of the present inventors, unless bonded under such a level of pressure, good bonding strength cannot be obtained. Additionally, unless the band cross section area A with a cross section perpendicular to the band length direction at the band bonding section 4 is greater than 20 mm$^2$, it is difficult to combat the significantly high heat and tension from the tire during high-speed travel to prevent plastic deformation of the band member 3.

In the present technology, the band section (band portion) preferably has a yield strength at the band bonding section 4 of 330 N or greater. When the band section has a yield strength of 330 N or greater, plastic deformation of the band member 3 can be prevented even after a long period of traveling at high speeds in excess of 300 km/h. The upper limit of the yield strength is not particularly limited and is preferably set to 2000 N or less.

In general, providing the band member 3 across the entire circumference in the tire circumferential direction is preferable in terms of obtaining the effect of holding the noise absorbing member 2 long and at a high level.

Figure 3A:
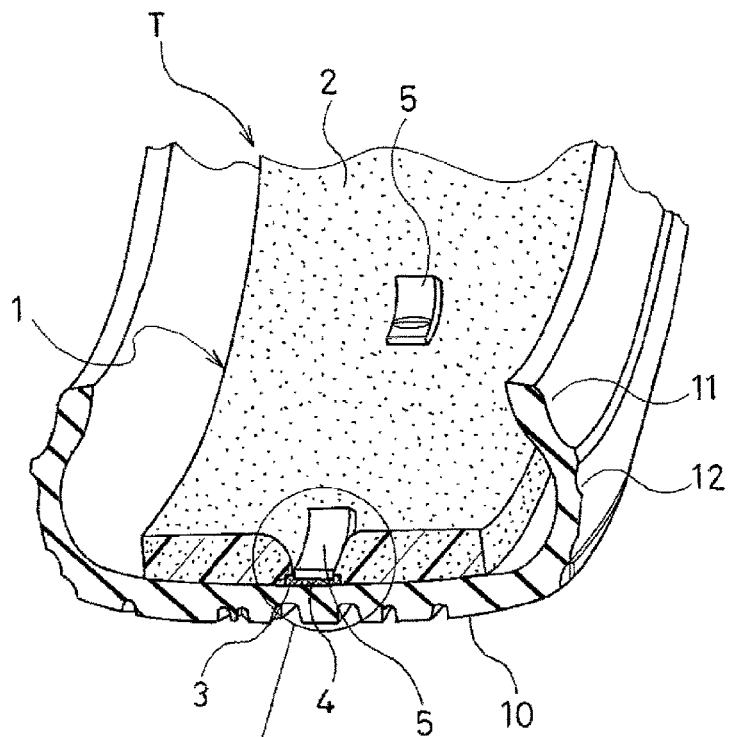
FIG. 3A is a cut away perspective view of main parts illustrating a cut away part of an embodiment of a pneumatic tire according to the present technology in which the tire noise reduction device according to the present technology is mounted inside a tire cavity and FIG. 3B is an enlarged view illustrating enlarged main parts thereof.
Figure 3B:
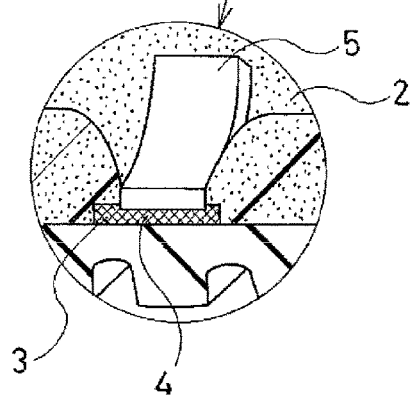

FIGS. 3A and 3B illustrate the pneumatic tire T according to the present technology. In FIGS. 3A and 3B, the pneumatic tire T is provided with a tread portion 10, a pair of left-right bead portions 11, and sidewall portions 12 that mutually connect the tread portion 10 and the bead portions 11. Additionally, the tire noise reduction device 1 schematically illustrated in FIG. 1 with an annular shape is installed on an inner surface of the tread portion 10.

The band member 3 preferably uses a resin with excellent durability with respect to repeated bending deformation as the material. It is preferable to use, for example, a polypropylene resin (PP resin). The same applies to the bonding member 5 and, for example, it is preferable to use a polypropylene resin (PP resin). If both members are the same type of resin material, the bonding strength can generally be made to be high as a result, and the same also applies to cases other than using the polypropylene resin (PP resin).

Since thermal bonding can be used as the bonding fixing means for the noise absorbing member 2 and the band member 3 when both members are thermoplastic synthetic resins, it is important to form the band member 3 of a thermoplastic resin in order to enable thermal bonding, have good formability, and the like. Then, as the benefits of adopting thermal bonding, in particular, there is the point that, by using the plate-like bonding member 5 (bonding plate or bonding chips) formed of thermoplastic resin and, for example, pressing the vibration horn 6 (not illustrated) of the ultrasonic welding machine to a bonding member 5 from the top of the bonding member 5, it is possible to thermally bond the noise absorbing member 2, the band member 3, and the bonding member 5 while thermally deforming the bonding member 5 and the noise absorbing member 2.

A structural model is illustrated in FIGS. 3A and 3B. FIG. 3B is an enlarged view of the main parts in FIG. 3A. In FIGS. 3A and 3B, the small bonding member 5 is in a state of being bent into a "V shape" at a key point in the tire circumferential direction and the three parts described above are partially and integrally bonded by thermal bonding.

Additionally, FIGS. 4A to 4C illustrate an example of a method for thermal bonding the bonding member 5 and the band member 3 in a case of using an ultrasonic welding machine. First, as illustrated in FIG. 4A, the noise absorbing member 2 is arranged between the band member 3 and the plate-shaped bonding member 5 formed of thermoplastic resin. Next, as illustrated in FIG. 4B, the vibration horn 6 of the ultrasonic welding machine is pressed into the bonding member 5 such that the bonding member 5 is set into a state of being bent into a "V shape", and the bent tip portion thereof is locally heated. As a result, as illustrated in FIG. 4C, the bonding member 5 and the band member 3 are further integrated through the noise absorbing member 2 by the thermal bonding. The band bonding section 4 is formed in the integrated part. The vibration horn 6 is used selecting conditions including output, time, and the like, so that the band bonding section 4 has a band thickness H (mm) described above that satisfies Formula (b) and the band cross section area A with a cross section perpendicular to the band length direction at the band bonding section 4 is greater than 20 mm².

Figure 5A:
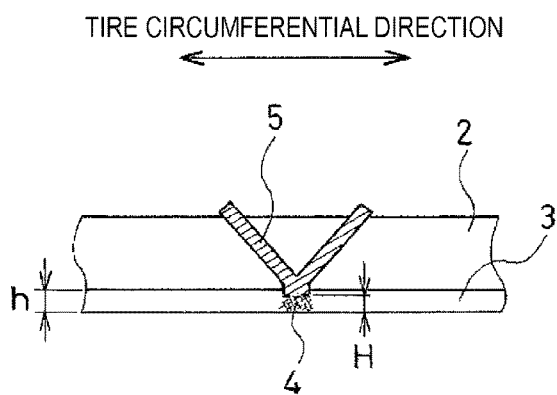
FIGS. 5A and 5B illustrate a state in the vicinity of a bonding section of the noise absorbing member and the band member in the tire noise reduction device according to the present technology.
Figure 5B:
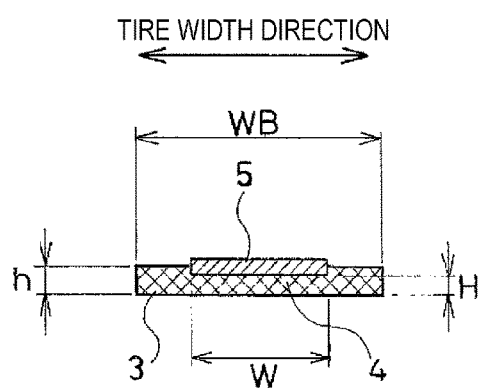

FIGS. 5A and 5B illustrate the state in the vicinity of the band bonding section 4. The band thickness H (mm) in the band bonding section 4 and the thickness h (mm) of the band member 3 satisfy the relationship $0.4 \leq H/h \leq 0.9$. Additionally, the product of the band thickness H (mm) in the band bonding section 4 and the width W (mm) of the band bonding section 4 is the band cross section area A (mm²) with a cross section perpendicular to the band length direction at the band bonding section 4.

The noise absorbing member 2 may be divided into a plurality of pieces as illustrated in FIG. 1, or may be formed as one continuous member with an overall annular shape.

In addition, providing the band bonding sections 4 in at least two locations with respect to one noise absorbing member 2 is preferable for the durability, cost, and to enable stable processing.

Figure 6A:
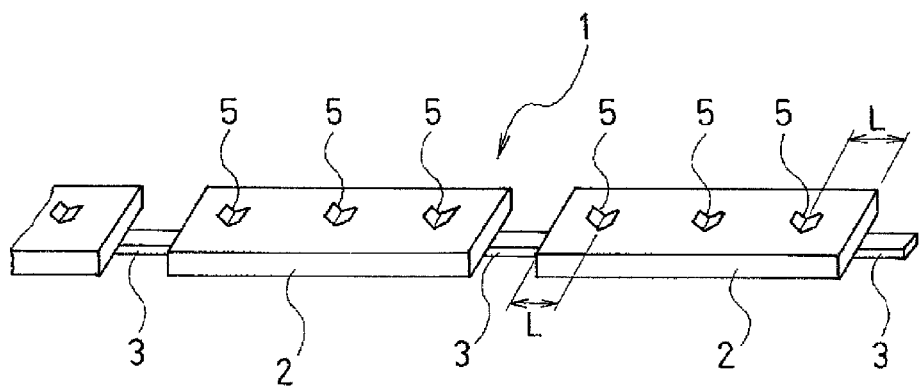
FIGS. 6A and 6B are external perspective views schematically illustrating other embodiments of a tire noise reduction device according to the present technology.
Figure 6B:
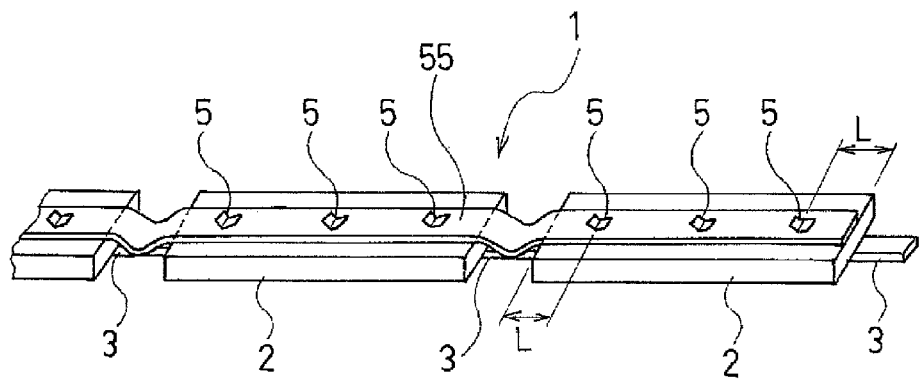

In addition, the position of the band bonding section 4 is a distance from 30 to 80 mm (L in FIGS. 6A to 6B) from the end portion of the noise absorbing member 2 in the circumferential direction, which is preferable in terms of suppressing flapping of the noise absorbing member 2 and being able to suppress damage to the porous material. More preferably, the position is a distance from 40 to 60 mm from the end portion of the noise absorbing member 2 in the circumferential direction.

Figure 7A:
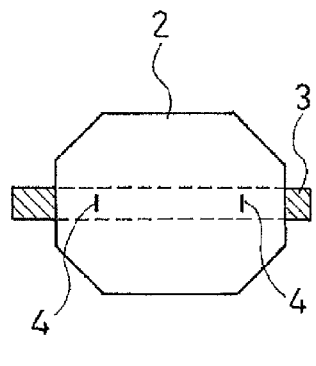
FIGS. 7A to 7D schematically illustrate examples of various forms of the band member which can be used in the tire noise reduction device according to the present technology.
Figure 7B:
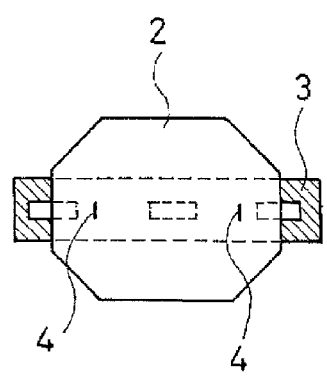
Figure 7C:
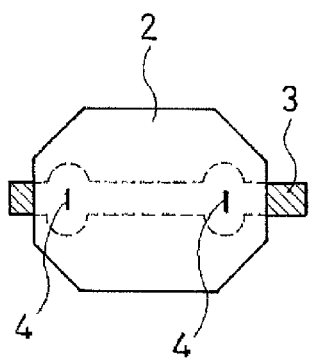
Figure 7D:
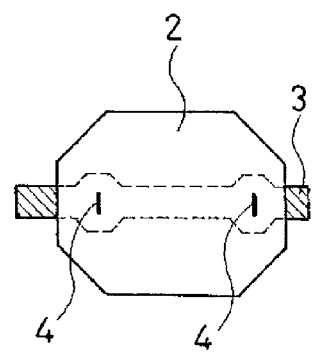

FIGS. 7A to 7D schematically illustrate examples of various forms of the band member 3 which can be used in the tire noise reduction device 1 according to the present technology. FIG. 7A illustrates a configuration similar to that illustrated in FIG. 1 and the like in which the width WB is uniform and comparatively small. FIG. 7B illustrates a configuration in which the width WB is comparatively large and rectangular holes are provided at key points for overall weight reduction. FIG. 7C illustrates a configuration in which the width is comparatively small but widened sections with arc-like edges are provided to increase the width only in the vicinity of the portions where the band bonding sections 4 are located. FIG. 7D is a configuration similar to that illustrated in FIG. 7C, but the widened sections have trapezoidal edges.

These configurations can be used as appropriate for the band member 3. Note that in configurations with large and small band widths, the band width WB represents a minimum width value in normal cases.

Figure 8:
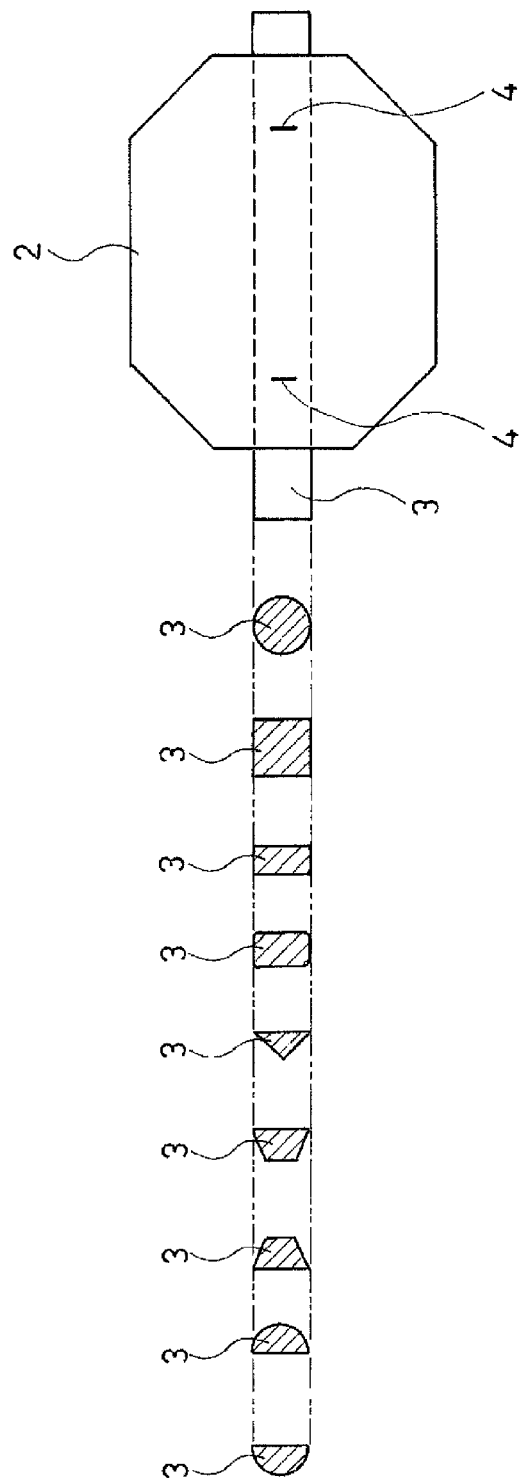
FIG. 8 schematically illustrates examples of the band member which can be used in the tire noise reduction device according to the present technology and specifically various forms of the lateral cross-sectional shape.

FIG. 8 schematically illustrates examples of the band member 3 which can be used in the tire noise reduction device 1 according to the present technology and specifically illustrates various forms of the lateral cross-sectional shape. As illustrated here, shapes able to be used as the lateral cross-sectional shape of the band member 3 include a circular shape, a semicircular shape, a trapezoidal shape, a square shape, a rectangular shape, an isosceles triangular shape, and the like. When such a band member 3 is used, the thickness h of the band member 3 represents the thickness at the thickest portion in normal cases.

Figure 9:
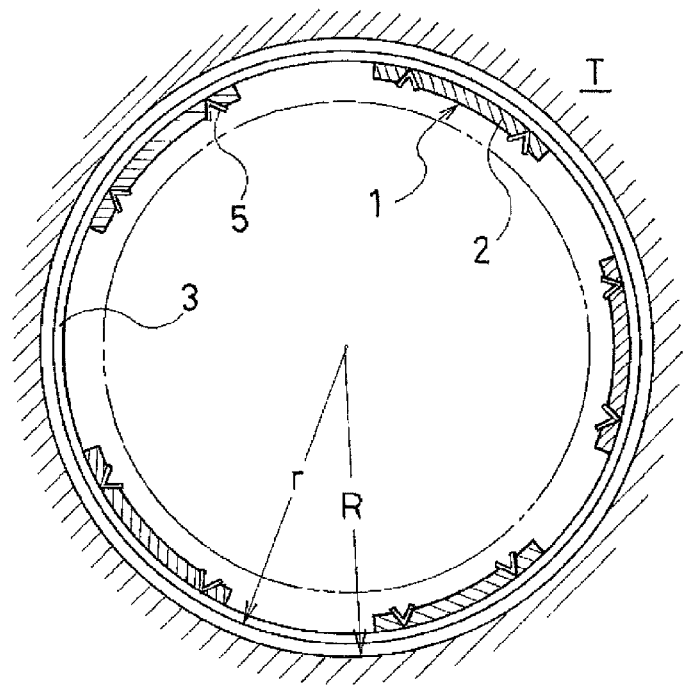
FIG. 9 is a tire circumferential direction cross sectional view schematically illustrating a preferable embodiment of the pneumatic tire where the tire noise reduction device according to the present technology is arranged in the tire cavity space and for illustrating a preferable relationship between the inner diameter (radius) R of the tire and the annular shape outer diameter (radius) r of the band member formed in an annular shape.

FIG. 9 is a tire circumferential direction cross sectional view schematically illustrating a preferable embodiment of the pneumatic tire T where the tire noise reduction device 1 according to the present technology is arranged in the tire cavity space and for illustrating a preferable relationship between the inner diameter (radius) R of the tire and the annular shape outer diameter (radius) r of the band member 3 formed in an annular shape. According to the findings of the present inventors, the inner diameter (radius) R of the tire and the annular shape outer diameter (radius) r of the band member 3 formed in an annular shape preferably have a relationship which satisfies the following Formula (c).

$$0.9 \leq r/R \leq 0.99 \quad \text{(c)}$$

That is, the annular shape outer diameter (radius) r of the band member 3 is smaller than the inner diameter (radius) R of the tire and the tire noise reduction device 1 according to the present technology has a dimensional relationship where, when arranged in the cavity space of the pneumatic tire T, storage is possible without contact with the cavity surface. The tire noise reduction device 1 having such a dimensional relationship is, in particular, arranged on the tire cavity surface without bonding with an adhesive or the like. By doing so, the tire noise reduction device 1 is naturally entrained by the rotary movement of the tire and the tire noise reduction device 1 does not peel off or the like along with the tire movement in comparison with a case of being bonded with an adhesive or the like and, as a result, it is possible to realize the pneumatic tire T which is mounted with the tire noise reduction device 1 inside the tire cavity with good durability.

EXAMPLES

In the present technology, the yield strength of the band section at the band bonding section is determined by the following method.
(1) Yield Strength of Band Section at Band Bonding Section For the thermoplastic resin forming the band, the yield stress of the thermoplastic resin was determined by performing the tensile test according to JIS (Japanese Industrial Standard) K7161. In the test, a JIS No. 1 dumbbell (thickness 1 mm) was produced, the average yield stress was determined with the n number as 10 under an atmosphere of 80° C. at a pulling rate of 10 mm/min. On the other hand, the band cross section area A (mm$^2$) with a cross section perpendicular to the band length direction at the band bonding section 4 is determined by observation with a microscope or the like (the average value thereof was determined with the n number as 10), the value of the yield stress of the thermoplastic resin obtained as described above was multiplied by the obtained cross section area A, and this value was set as the yield strength of the band section at the band bonding section.

In addition, the high-speed durability test was performed with the following method.
(2) High-Speed Durability Test Starting from a traveling speed of 250 km/h, each test tire travels continuously for 10 minutes at that speed, the presence or absence of band defects was examined and the traveling speed was increased in a unit of 10 km/h in a case where no abnormalities were found and, after continuously traveling at that speed for 10 minutes, the presence or absence of band defects was examined. By repeating the test, the speed at which band defects were generated was set as the band defect speed. For the presence or absence of the band defects, it was determined that band defects (deformation) occurred when elongation of the band was clearly determined visually (necking start time) by carrying out the high-speed durability test.

Working Examples 1 to 8 and Comparative Examples 1 and 4

Test tires of a tire size 275/35R20 100Y were prepared as test tires and tire noise reduction devices (Working Examples 1 to 8) of the present technology and tire noise reduction devices (Comparative Examples 1 and 4) not of the present technology were mounted in each of the test tire cavities.

Each of the test tires were provided with a noise absorbing member (width of 240 mm) made of urethane foam (porous material). The band width WB, the thickness h (mm) of the band member, the band thickness H (mm) of the band bonding section, and the band cross section area A with a cross section perpendicular to the band length direction at the band bonding section 4 were varied to prepare a total of 12 types of test tires (Working Examples 1 to 8 and Comparative Examples 1 to 4).

As illustrated in FIGS. 1 and 2, the band members were set as elastic band members formed of thermoplastic resin present in an annular shape on the tire periphery and a plurality of noise absorbing members were present across the periphery; however, the noise absorbing member were divided into a plurality of parts. The bonding members and the band members were all formed of a thermoplastic resin (polypropylene resin, heat distortion temperature (ASTM (American Society of the International Association for Testing and Materials) D648 heat-resisting temperature (continuous)) 60° C.). The noise absorbing member and the band member using the bonding member were bonded and integrated using an ultrasonic welding machine.

The evaluation results for each test tire are shown in Table 1.

TABLE 1-1

|  | Comparative Example 1 | Working Example 1 | Comparative Example 2 | Working Example 2 |
|---|---|---|---|---|
| Band width WB (mm) | 20 | 20 | 21 | 25 |
| Band member thickness h (mm) | 1 | 1.5 | 1 | 1 |
| Bonding section band thickness H (mm) | 0.9 | 1.4 | 0.9 | 0.9 |
| H/h ratio | 0.9 | 0.9 | 0.9 | 0.9 |
| Bonding section width W (mm) | 15 | 15 | 15 | 15 |
| Band cross sectional area at band bonding position (mm$^2$) | 18.5 | 28.5 | 19.5 | 23.5 |
| Band yield strength at band bonding position (N) | 310.8 | 478.8 | 327.6 | 394.8 |
| Band defect speed (km/h) | 260 | 290 | 260 | 280 |
| Peeling of bonding member | No | No | No | No |

TABLE 1-2

|  | Comparative Example 3 | Working Example 3 | Working Example 4 | Working Example 5 |
|---|---|---|---|---|
| Band width WB (mm) | 30 | 30 | 30 | 30 |
| Band member thickness h (mm) | 1 | 1 | 1 | 1 |
| Bonding section band thickness H (mm) | 0.3 | 0.4 | 0.6 | 0.9 |
| H/h ratio | 0.3 | 0.4 | 0.6 | 0.9 |
| Bonding section width W (mm) | 15 | 15 | 15 | 15 |
| Band cross sectional area at band bonding position (mm$^2$) | 19.5 | 21.0 | 24.0 | 28.5 |
| Band yield strength at band bonding position (N) | 327.6 | 352.8 | 403.2 | 478.8 |
| Band defect speed (km/h) | 260 | 290 | 290 | 290 |
| Peeling of bonding member | No | No | No | No |

TABLE 1-3

|  | Comparative Example 4 | Working Example 6 | Working Example 7 | Working Example 8 |
|---|---|---|---|---|
| Band width WB (mm) | 30 | 40 | 50 | 70 |
| Band member thickness h (mm) | 1 | 1 | 1 | 1 |
| Bonding section | 0.95 | 0.9 | 0.9 | 0.9 |

TABLE 1-3-continued

| | Comparative Example 4 | Working Example 6 | Working Example 7 | Working Example 8 |
|---|---|---|---|---|
| band thickness H (mm) | | | | |
| H/h ratio | 0.95 | 0.9 | 0.9 | 0.9 |
| Bonding section width W (mm) | 15 | 15 | 15 | 15 |
| Band cross sectional area at band bonding position (mm$^2$) | 29.3 | 38.5 | 48.5 | 68.5 |
| Band yield strength at band bonding position (N) | 491.4 | 646.8 | 814.8 | 1150.8 |
| Band defect speed (km/h) | 290 | 300 | 310 | 330 |
| Peeling of bonding member | Yes | No | No | No |

As can be understood from these results, the tire noise reduction device and the pneumatic tire mounted with the tire noise reduction device according to the present technology are excellent in high-speed durability and can exhibit a tire noise reduction effect with good durability even under conditions of extremely high speeds (for example, 270 km/h or greater, and 300 km/h or greater).

The invention claimed is:

1. A tire noise reduction device comprising:
a noise absorbing member formed of a porous material;
a band member formed of a thermoplastic resin, the band member being formed in an annular shape in a tire circumferential direction for mounting the noise absorbing member on a tire inner surface;
a bonding member bent into a V-shaped cross section; and
a band bonding section at a key point where the noise absorbing member, the band member, and the bonding member are bonded by interposing the noise absorbing member between the bonding member and the band member; wherein
the band member has a band width WB satisfying the following formula (a),
a band thickness H (mm) of the band bonding section and a thickness h (mm) of the band member have a relationship satisfying the following formula (b), and
a band cross section area A with a cross section perpendicular to a band length direction at a band bonding position is greater than 20 mm$^2$, $$20 \text{ mm} \leq WB \leq \text{noise absorbing member width (mm)} \tag{a}$$

$$0.4 \leq H/h \leq 0.9 \tag{b}$$

2. The tire noise reduction device according to claim 1, wherein a yield strength of a band section at the band bonding position under an 80° C. environment is 330 N or greater.

3. The tire noise reduction device according to claim 1, wherein the band bonding section is provided in at least two locations relative to the noise absorbing member.

4. The tire noise reduction device according to claim 1, wherein a position of the band bonding section is 30 to 80 mm from an end portion of the noise absorbing member.

5. The tire noise reduction device according to claim 1, wherein bonding of the noise absorbing member with the band member and the bonding member is carried out by ultrasonic welding.

6. The tire noise reduction device according to claim 1, wherein the band member and the bonding member are formed of the same synthetic resin material.

7. A pneumatic tire, comprising: the tire noise reduction device described in claim 1 disposed in a tire cavity space using the band member.

8. The pneumatic tire according to claim 7, wherein an inner diameter (radius) R of the tire and an annular shape outer diameter (radius) r of the band member formed in the annular shape have a relationship which satisfies the following formula (c), $$0.9 \leq R/R \leq 0.99 \tag{c}$$

9. The tire noise reduction device according to claim 2, wherein the band bonding section is provided in at least two locations relative to the noise absorbing member.

10. The tire noise reduction device according to claim 9, wherein a position of the band bonding section is 30 to 80 mm from an end portion of the noise absorbing member.

11. The tire noise reduction device according to claim 10, wherein bonding of the noise absorbing member with the band member and the bonding member is carried out by ultrasonic welding.

12. The tire noise reduction device according to claim 11, wherein the band member and the bonding member are formed of the same synthetic resin material.

13. A pneumatic tire, comprising: the tire noise reduction device described in claim 12 disposed in a tire cavity space using the band member.

14. The pneumatic tire according to claim 13, wherein an inner diameter (radius) R of the tire and an annular shape outer diameter (radius) r of the band member formed in the annular shape have a relationship which satisfies the following formula (c), $$0.9 \leq R/R \leq 0.99 \tag{c}$$

* * * * *